United States Patent [19]

Seymour et al.

[11] 4,307,562

[45] Dec. 29, 1981

[54] TOBACCO STRIPPER NIP ROLL

[75] Inventors: Shaun A. Seymour; Jack W. Crane, both of New Holland, Pa.

[73] Assignee: Sperry Corporation, New Holland, Pa.

[21] Appl. No.: 187,877

[22] Filed: Sep. 17, 1980

[51] Int. Cl.³ .............................................. A01D 45/16
[52] U.S. Cl. ..................................... 56/27.5; 130/5 C
[58] Field of Search ..................... 56/27.5, 63; 130/8, 130/5 B, 5 C

[56] References Cited

U.S. PATENT DOCUMENTS

| | | | |
|---|---|---|---|
| 120,689 | 11/1871 | Whitney et al. | 130/5 C |
| 2,180,594 | 11/1939 | Kuhlman | 130/5 C |
| 4,037,391 | 7/1977 | Mitchell et al. | 56/27.5 |

FOREIGN PATENT DOCUMENTS 552921  4/1977  U.S.S.R. ............................... 56/27.5

*Primary Examiner*—Robert A. Hafer
*Attorney, Agent, or Firm*—James R. Bell; Frank A. Seemar

[57] ABSTRACT

A tobacco leaf stripping machine is provided having an improved tobacco stripping roller that has a radially contoured nose, a transition area and a base portion which primarily engages the tobacco leaf for stripping so as to permit tobacco leaves to be continuously fed along a nip formed by a pair of counter-rotating stripping rollers as well as permitting the stripping rollers to be easily removed from the stripping machine for cleaning.

18 Claims, 3 Drawing Figures

TOBACCO STRIPPER NIP ROLL

BACKGROUND OF THE INVENTION

This invention relates generally to tobacco stripping machines used to strip the cured leaves from stalks of burley tobacco. More specifically, the invention deals with the stripping rollers which engage the leaves as they hang generally downwardly from the horizontally supported tobacco stalk.

The stripping of burley tobacco has traditionally been a labor intensive operation that has been done by hand by farmers for several hundred years. Recently a burley tobacco stripping machine has been developed which resolves this time consuming operation in a manner which does not damage the tender tobacco leaf.

It has been discovered in working with this tobacco stripping machine that the design of the stripping rollers is essential to the effectiveness of the operation. There are at least two of these rollers mounted for counter rotation beneath a stalk receiving member. It has been found that the contour of the exterior surface of the stripping roller, as well as the material utilized to form the stripping roller, is of critical importance in the successful operation of the tobacco stripper. The material which comprises the stripping roller must be resilient enough to give when the tobacco leaf passes therebetween without crushing the leaf, but yet be firm enough to grip at the nip to exert a gentle but generally downwardly pulling action to remove the leaf from the stalk. Additionally, because the tobacco leaf is fed into the nip formed between the counter-rotating stripping rollers, the edge of the rollers first encountered by the leaf must be shaped so as to promote the easy movement of the leaves from this entry area into the main stripping area or base portion of the stripping roller. Finally, it has been found under some crop conditions that a gummy substance builds up on the surface of the stripping rollers. This gummy substance must be removed and can easily be done so by immersing the stripping roller in water. Therefore, it is essential that the stripping rollers be mounted to the tobacco stripping machine in a manner that permits their easy removal.

The foregoing problems are solved in the design of the stripping roller of the present invention by providing in a tobacco stripping machine a stripping roller that is contoured in shape having a nose portion, a transition area and a base portion which primarily engages the tobacco leaf for stripping so as to permit tobacco leaves to be continuously fed along a nip formed by a pair of counter-rotating stripping rollers as well as permitting the stripping rollers to be easily removed from the stripping machine for cleaning.

SUMMARY OF THE INVENTION

It is a principal object of the present invention to provide in a tobacco stripping machine a stripping roller including a nose portion having a first and a second end forward of a cylindrical portion. The second end is adjacent a transition area. The nose portion is generally symmetrically mounted about a support means having a periphery that describes, in longitudinal cross-sectional configuration, a generally non-linear radially decreasing path about the support means from the transition to the first end.

These and other objects, features and advantages are obtained by providing in a tobacco leaf stripping machine an improved tobacco stripping roller that has a radially contoured nose passing through a transition area into the base portion of the roller's surface where primary leaf stripping is accomplished which is also easily removable from the stripping machine to facilitate the cleaning of the rollers.

BRIEF DESCRIPTION OF THE DRAWINGS

The features and advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
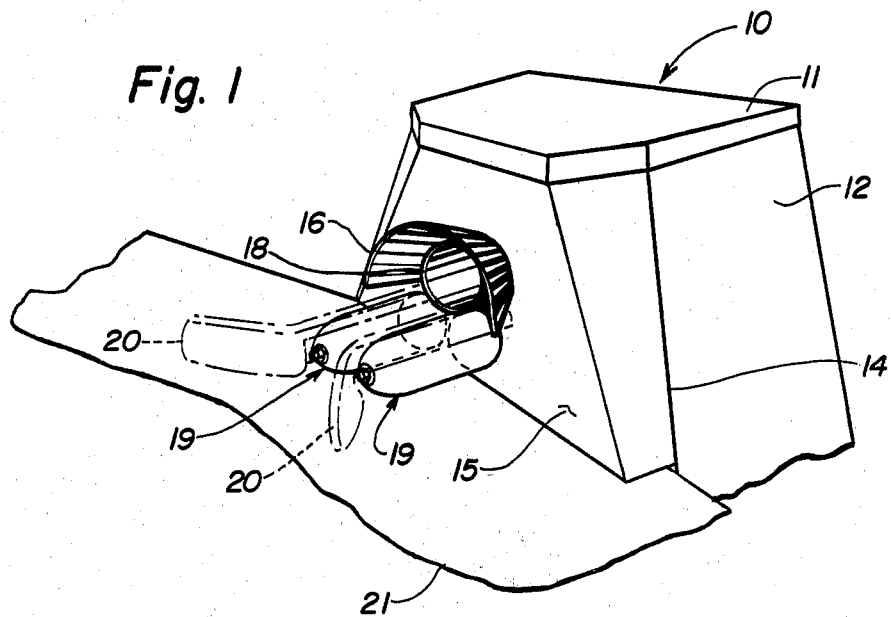
FIG. 1 is a partial illustration of the tobacco stripping machine showing the relative positioning of the tobacco leaf stripping rollers with respect to the stalk infeed apparatus.

Seen generally in FIG. 1 is the tobacco stripper 10 in outline form. The tobacco stripper 10 has a housing which surrounds the working components that includes a housing top 11, a housing side 12, an angled side 14 and a front side 15. A stalk guide 16 assists the operator in directing the stalk of tobacco into the rotating stripping rollers indicated generally by the numeral 19. A leaf and stalk guide 20 is shown in phantom which assists in directing the tobacco leaves into the stripping rollers. A conveyor 21 underlies the stripping rollers 19 and carries the stripped tobacco leaves to a sorting location.

The tobacco stripper 10 thus far has been described only generally. A more detailed description and disclosure of the working components of the tobacco stripper 10 are found in co-pending U.S. Application Ser. No. 956,667 filed by Lawrence W. Butcher, specifically incorporated by reference in pertinent part hereinafter.

Figure 2:
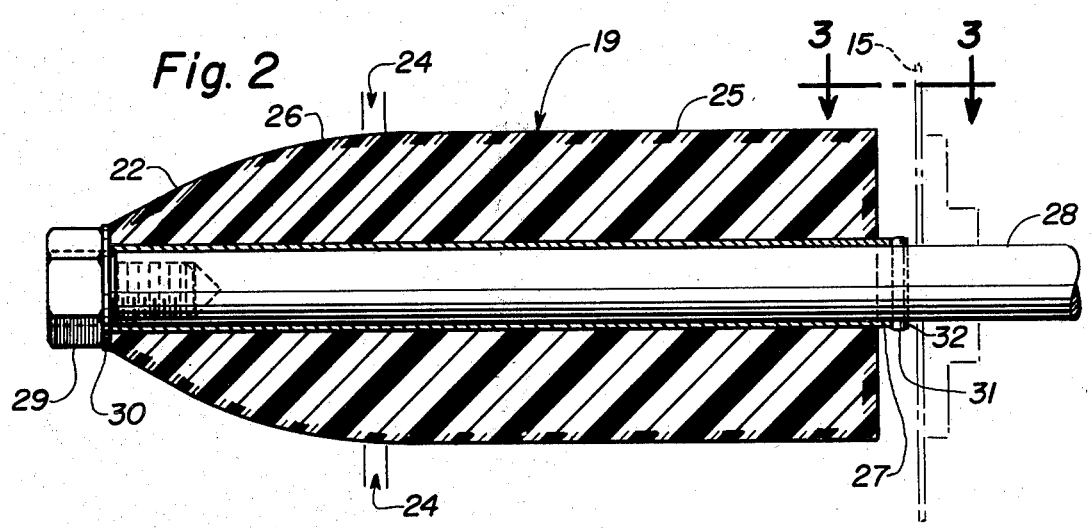
FIG. 2 is an enlarged longitudinal cross-sectional view of a leaf stripping roll mounted to the shaft of the tobacco stripper.
Figure 3:
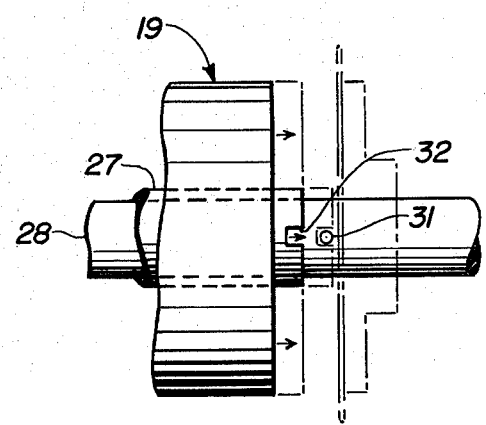
FIG. 3 is an enlarged sectional view of the notch in the roll sleeve taken along the line 3—3 of FIG. 2.

Specifically looking at the invention as shown in FIG. 2, one of the stripping rollers 19 is shown in longitudinal cross-sectional configuration. The stripping roller has a nose portion 22, a base portion rearwardly of the nose portion 25 with a transition at 24 separating the nose portion 22 and the base portion 25. The roller has a water-resistant skin-like surface 26 which completely covers the nose portion 22, the transition 24 and the base portion 25. Beneath the skin-like covering 26 is a polyurethane foam substance that is bonded to sleeve 27 which runs throughout the length of the stripping roller 19. The skin-like covering 26 is also composed of polyurethane. The roller 19 is adapted to have the sleeve 27 slip over the shaft 28 of the tobacco stripper 10. Shaft 28 is rotatably driven by apparatus shown in the aforementioned incorporated by reference patent application. Stripping roller 19 is seated rearwardly on the shaft 28 and is retained in placed by a cap screw 29 and washer 30. The cap screw 29 has its threads fit within the threaded portion of the hollow shaft 28. The washer 30 fits between the flat portion of the nose 22 and the head of the cap screw 29. At its rearward end the sleeve 27 of the roller 19 is secured for rotational movement by the notches 32 on opposing sides of the sleeve 27 seating against the locking pin 31. Locking pin 31 may either be two small nips suitably fastened to the exterior of the shaft 28 or a pin which fits completely through the hollow portion of the shaft 28.

The contour or the shape of stripping roller 19 is essential when the tobacco stripper is operated. The sloping portion of the nose moves from its front portion upwardly and rearwardly to form at the transition area a union with the base portion of the stripping roller that avoids any rough or sharp edges. The nose portion 22 is shown in longitudinally cross-sectional view in FIG. 2 with its periphery being of decreasing radial length as it moves from its largest radial point adjacent the transition 24 down to the front portion of the nose adjacent the cap screw 29. The contoured path of the periphery is a generally non-linear decreasing radial path from the transition area 24 to the forwardmost end of the nose portion 22.

The roller 19 is designed for easy attachment and removal from the shaft 28 of the tobacco stripper to permit cleaning of the exterior or skin-like surface 26 which may become covered with a gummy substance during the stripping operation. Being able to immerse the rollers in water promotes the easy cleaning of the surface and allows the stripping operation to recommence quickly and with little inconvenience. The water resistant nature of the skin-like exterior permits the rollers to be immersed. The cap screw 29 and locking washer 30 serve to hold each stripping roller 19 firmly on the shaft 28. Locking pin 31 cooperates with the notches 32 of sleeve 27 to rotatably secure each stripping roller 19 to the shaft 28 during operation.

In operation, stalks of tobacco are fed in end-to-end fashion into the rotary stalk infeed 18. The cured tobacco leaves hang generally downwardly from the stalk and are engaged by the nip formed by the counter-rotating rollers 19. As the leaves enter the nip they pass between the nose portion 22 of each roller and are guided rearwardly over the transition area 24 into contact with the main stripping area of the base portion 25 of the rollers. The counter-rotating movement of the stripping rollers 19 cause the base portion 25 to grip the leaves gently, but firmly to pull the leaves generally downwardly, thereby effecting the removal or stripping of the leaves from the tobacco stalk. The tobacco stalk continues to be fed into the tobacco stripping machine 10 by means described in detail in the aforementioned incorporated by reference patent application until the entire stalk length has been stripped and fed into the machine 10 for processing. The absence of any pointed junction between the nose portion 22 and the base portion 25 of the stripping roller prevents the tobacco leaves from becoming caught or hung-up after transition and allows them to be smoothly and efficiently stripped from the stalk.

While the preferred structure in which the principles of the present invention have been incorporated is shown and described above, it is to be understood that the invention is not limited to the particular details thus presented but, in fact, widely different means may be employed in the practice of the broader aspects of this invention. The scope of the appended claims is intended to encompass all obvious changes in the details, materials and arrangements of parts that will occur to one of ordinary skill in the art upon a reading of this disclosure.

Having thus described the invention, what is claimed is:

1. In a tobacco leaf stripping machine having at least a pair of counter-rotating leaf stripping rollers mounted to a frame and driven by a power unit, the improvement comprising:
   at least one roller having a first nose portion with a first end of a first diameter and an opposing second end of a second diameter, a second generally cylindrically shaped portion with a base end and a forward end interconnected with the nose portion at a transition, the transition being adjacent the first end and the forward end such that the nose portion has a periphery that describes a longitudinal profile a generally non-linear decreasing radial path from the transition to the seond end;
   the second diameter is greater than the first diameter;
   each roller further comprises a polyurethane foam interior with a uniform surfaced water resistant polyurethane skin-like exterior;
   each roller further comprises a generally hollow cylindrical sleeve passing through the center thereof to which is bonded the polyurethane foam interior;
   each roller is further detachably mounted to the frame by a rotating shaft so that each roller may be easily removed for cleaning;
   the sleeve mounts about a rotating shaft and is removably fastened thereto by fastening means, the sleeve further having fastening means receiving apparatus into which the fastening means are secured; and
   the fastening means receiving apparatus further comprises a pair of opposing notches.

2. The apparatus according to claim 1 wherein the fastening means further comprises an elongated locking pin extending through the shaft.

3. The apparatus according to claim 7 wherein the rotating shaft is hollow and elongate with a first end with internal threads.

4. The apparatus according to claim 3 wherein the fastening means further comprises a cap screw which threadingly inserts into the first end to help hold each roller in position on the shaft.

5. A stripping roller rotatably mountable to a tobacco stripping machine, the combination comprising:
   a generally elongate axial center support means rotatably connectable to the stripping machine;
   power means connected to the machine to rotatably drive the components of the machine;
   a first generally cylindrical portion mounted generally symmetrically about the support means;
   a transition area adjacent the first cylindrical portion mounted about the support means;
   a nose portion having a first end and a second end forward of the cylindrical portion with the second end being adjacent the transition area, the nose portion being generally symmetrically mounted about the support means having a periphery that describes in longitudinal cross-sectional configuration a generally non-linear radially decreasing path about the center support means from the transition to the first end;
   the roller is further detachably mounted to the stripping machine by the center support means so that it is easily removable for cleaning;
   the sleeve mounts about a rotating shaft and is removably fastened thereto by fastening means;
   the sleeve further comprises fastening means receiving apparatus into which the fastening means are selectively releasably secured to permit the roller to be easily removed for cleaning; and the fastening means receiving apparatus further comprises a pair of opposing notches.

6. The apparatus according to claim 5 wherein the fastening means further comprises an elongate locking pin extending through the shaft.

7. The apparatus according to claim 6 wherein the rotating shaft is hollow and elongate with a first end with internal threads.

8. The apparatus according to claim 7 wherein the fastening means further comprises a cap screw which threadingly inserts into the first end to help hold each roller in position on the shaft.

9. A stripping roller rotatably mounted to a tobacco stripping machine, the combination comprising:
- a generally elongate axial center support means rotatably connected to the stripping machine;
- power means connected to the machine to rotatably drive the components of the machine;
- a first generally cylindrical portion mounted generally symmetrically about the support means with a first diameter and having a first end and a second end, the first end being adjacent the machine;
- a transition area adjacent the first cylindrical portion mounted about the support means defined a longitudinally arcuate periphery having a first end adjacent the base portion and a second end distant therefrom;
- a nose portion having a first end and a second end, the second end being adjacent and forwardly of the cylindrical portion's second end, the nose portion further being generally symmetrically mounted about the support means and having a non-linear periphery of longitudinal cross-sectional configuration that is tangential at the second end of the nose portion to the second end of the transition;
- the first end of the nose portion has a second diameter which is less than the first diameter of the cylindrical portion;
- the support means further comprises a generally hollow cylindrical sleeve passing through the center of the roller;
- the roller further comprises a polyurethane foam interior which is bonded to the support means and a uniform surfaced water-resistant polyurethane skin-like exterior;
- the roller is further detachably mounted to the stripping machine by a rotating shaft so that the roller may be easily removed for cleaning; and
- the sleeve further has a pair of opposing notches therein adjacent the cylindrical portion and the machine.

10. The apparatus according to claim 9 wherein the opposing notches of the sleeve cooperate with a locking pin extending through the rotating shaft so that the roller is rotatably retained in position.

11. The apparatus according to claim 10 wherein the rotating shaft is hollow and elongate with a first end having internal threads within.

12. The apparatus according to claim 11 wherein a cap screw fits within the hollow first end to secure the roller to the shaft.

13. In a tobacco leaf stripping machine having at least a pair of counter-rotating stripping rollers mounted to the frame to form a nip along a first axis into which tobacco leaves are fed, tobacco stalk infeed means mounted to the frame above the nip to receive a stalk of tobacco and move it into the frame along a second axis directing the downwardly extending tobacco leaves into the nip, the improvement comprising:
- at least one stripping roller having a first nose portion with a first end and a generally cylindrically shaped second portion with a base end having a first diameter interconnected at a transition, the first end being forwardly and distal of the transition, the nose portion further having a periphery that describes, in longitudinal cross-sectional configuration, a generally non-linear radially decreasing path from the transition to the first end such that the first end has a second diameter less than the first diameter;
- the support means further comprises a generally hollow cylindrical sleeve passing through the center of the roller;
- the roller is further detachably mounted to the stripping machine by a rotating shaft so that the roller may be easily removed for cleaning; and
- the sleeve further has a pair of opposing notches therein adjacent the cylindrical portion and the machine.

14. The apparatus according to claim 13 wherein the opposing notches of the sleeve cooperate with a locking pin extending through the rotating shaft so that the roller is rotatably retained in position.

15. The apparatus according to claim 14 wherein the rotating shaft is hollow and elongate with a first end having internal threads within.

16. The apparatus according to claim 15 wherein a cap screw fits within the hollow first end to secure the roller to the shaft.

17. The apparatus according to claim 16 wherein the roller further comprises a polyurethane foam interior which is bonded to the support means and a uniform surfaced water-resistant polyurethane skin-like exterior.

18. In a tobacco leaf stripping machine having at least a pair of counter-rotating stripping rollers mounted to a frame to form a nip along a first axis into which tobacco leaves are fed, tobacco stalk infeed means mounted to the frame above the nip to receive a stalk of tobacco and move it into the frame along a second axis directing downwardly extending tobacco leaves into the nip, the improvement comprising:
- at least one stripping roller having a first nose portion with a first end and a generally cylindrically shaped second portion with a base end having a first diameter interconnected at a transition, the first end being forwardly and distal of the transition, the nose portion further having a periphery that describes, in longitudinal cross-sectional configuration, a generally non-linear radially decreasing path from the transition to the first end such that the first end has a second diameter less than the first diameter;
- the support means further comprises a generally hollow cylindrical sleeve passing through the center of the roller;
- the roller is further detachably mounted to the stripping machine by a rotating shaft so that the roller may be easily removed for cleaning;
- at least one notch in said sleeve; and
- means for cooperating engagement with said notch, said means including a pin extending from said shaft.

* * * * *